(12) United States Patent
Begle (10) Patent No.: US 12,344,505 B2
(45) Date of Patent: Jul. 1, 2025

(54) ELEVATOR SYSTEM WITH VISITOR OPERATING MODE

(71) Applicant: INVENTIO AG, Hergiswil (CH)

(72) Inventor: Guntram Begle, Weggis (CH)

(73) Assignee: Inventio AG, Hergiswil (CH)

( * ) Notice: Subject to any disclaimer, the term of this patent is extended or adjusted under 35 U.S.C. 154(b) by 1604 days.

(21) Appl. No.: 16/619,711

(22) PCT Filed: Jun. 4, 2018

(86) PCT No.: PCT/EP2018/064580
§ 371 (c)(1),
(2) Date: Jun. 4, 2020

(87) PCT Pub. No.: WO2018/224426
PCT Pub. Date: Dec. 13, 2018

(65) Prior Publication Data
US 2020/0290842 A1  Sep. 17, 2020

(30) Foreign Application Priority Data
Jun. 7, 2017  (EP) ..................................... 17174705

(51) Int. Cl.
*B66B 1/34* (2006.01)
*B66B 1/46* (2006.01)
(Continued)

(52) U.S. Cl.
CPC .......... *B66B 1/3453* (2013.01); *B66B 1/3423* (2013.01); *B66B 1/3461* (2013.01);
(Continued)

(58) Field of Classification Search
CPC ................ B66B 1/3415; B66B 1/3423; B66B 1/3446–3461; B66B 1/468;
(Continued)

(56) References Cited

U.S. PATENT DOCUMENTS 6,011,839 A   1/2000  Friedli et al.
10,486,937 B2 * 11/2019  Baldi ................... B66B 13/165
(Continued)

FOREIGN PATENT DOCUMENTS

CN    102205921 A   10/2011
CN    104918872 A   9/2015
(Continued)

*Primary Examiner* — Christopher Uhlir
(74) *Attorney, Agent, or Firm* — Wiggin and Dana LLP (57) ABSTRACT

In a system with an elevator system, a host can grant a visitor access to a building and switch the elevator system into a visitor operating mode in order to transport the visitor to a destination floor. The host can initiate a movement of the elevator car to a first defined floor, on which a visitor would like to enter an elevator car, by means of an input on a mobile device. A camera arranged in the elevator car and a camera recording, which is produced by means of said camera and displayed on the mobile device, enable the host to check if only the user is located in the elevator car. If this is the case, the host can initiate the movement of the elevator car to the destination floor by means of an additional input on the mobile device.

13 Claims, 3 Drawing Sheets

(51) Int. Cl.
*B66B 13/14* (2006.01)
*H04N 7/18* (2006.01)

(52) U.S. Cl.
CPC ............ *B66B 1/468* (2013.01); *B66B 13/143* (2013.01); *H04N 7/183* (2013.01); *B66B 2201/101* (2013.01); *B66B 2201/4638* (2013.01); *B66B 2201/4653* (2013.01); *B66B 2201/4676* (2013.01); *B66B 2201/4684* (2013.01)

(58) Field of Classification Search
CPC ........... B66B 5/00–0012; B66B 2201/00–103; B66B 2201/405; B66B 2201/406; B66B 2201/4607–4684
See application file for complete search history.

(56) References Cited

U.S. PATENT DOCUMENTS

| | | |
|---|---|---|
| 2015/0114763 A1 | 4/2015 | Kim et al. |
| 2015/0314986 A1 | 11/2015 | Schwarzentruber |
| 2017/0026621 A1 | 1/2017 | Vellanki et al. |
| 2019/0012642 A1* | 1/2019 | Laas ................. G06Q 10/10 |

FOREIGN PATENT DOCUMENTS

| | | | | |
|---|---|---|---|---|
| CN | 105752772 A | 7/2016 | | |
| DE | 202016003883 U1 | 8/2016 | | |
| JP | 07215617 A | * 8/1995 | ........... | B66B 5/0012 |
| TW | 201601121 A | 1/2016 | | |
| WO | 2009116129 A1 | 9/2009 | | |

\* cited by examiner

ELEVATOR SYSTEM WITH VISITOR OPERATING MODE

CROSS-REFERENCE TO RELATED APPLICATIONS

This application is the national phase application under 35 U.S.C. § 371 claiming the benefit of priority based on International Patent Application No. PCT/EP2018/064580, filed on Jun. 4, 2018, which claims the benefit of priority based on European Patent Application No. 17174705.8, filed on Jun. 7, 2017. The contents of each of these applications are herein incorporated by reference.

FIELD OF THE INVENTION

The technology described herein generally pertains to a control method for an elevator system. In addition to the control method, exemplary embodiments of the technology also pertain to the elevator system.

BACKGROUND OF THE INVENTION

It is well known that an elevator system in a building serves for transporting a person from one floor to another floor. For this purpose, the person inputs a call, for example, on a call input terminal on the entry floor and an elevator car responding to the call transports the person to a desired destination floor. In order to ensure that only authorized persons can input a call for reasons of building security, the call input terminal may comprise or be connected to a reader in order to detect a credential (e.g. chip card, magnetic stripe card, code/PIN) of a person.

It is also known to control the access to a building in order to enhance the building security. Intercom systems with or without image transmission and doors with simple mechanical or electromechanical locks are conventionally used for this purpose. In this case, an audio/video device of the intercom system at a building entrance is connected to a plurality of audio/video devices in the individual residential and/or business units of a building via cable connections.

There also exist access control systems that are more complex than such intercom systems. For example, U.S. Pat. No. 9,077,716 describes an access control system, in which a mobile electronic device communicates with an electronic door lock via a Bluetooth or WLAN radio link and with a web server via a WAN (Wide Area Network) radio link in order to open the electronic lock by means of a code pattern generated by the web server. WO 2010/112586 A1 describes an access control system, in which a mobile telephone carried along by a user transmits an identification code to an access node. If the identification code is determined to be valid, the access node transmits an access code to the mobile telephone, which displays the access node [sic; code] on a screen. When the user holds the mobile telephone at a camera such that it can detect the displayed access code, the access control system checks if the detected access code is valid. Access is granted to the user if the access code is valid.

These access control systems provide a certain ease of use because the users do not have to carry along any credentials or conventional keys and do not have to remember any access code. After access has been granted to a person, however, the person is on his own and potentially can move freely about the building, namely also by using the elevator system. This typically does not represent a problem if the person resides or works in the building. However, if the person is, for example, a visitor who enters the building for the first time, it may be undesirable that the visitor can move freely about the building for safety reasons. It is furthermore undesirable for safety reasons that a potentially unauthorized person gains access to the building by following an authorized person (in a potentially undetected manner) and walking through a door opened by (or for) the authorized person. Consequently, there is a demand for a technology that better meets the relevant security requirements, can be cost-effectively implemented and nevertheless remains user-friendly.

SUMMARY OF THE INVENTION

One aspect of such a technology concerns a method for operating a system comprising an elevator system and an interface for communication via a communication network. The elevator system comprises an elevator control, an elevator car and a drive unit, which moves the elevator car between floors of the building upon activation by the elevator control. A camera is arranged in the elevator car in order to produce a camera recording of an interior of the elevator car.

According to the method, a first input signal is received by the interface, wherein the first input signal indicates that a host initiates a movement of the elevator car to a first defined floor, on which a visitor would like to enter the elevator car, by means of an input on a communication device. A first elevator control signal is generated by the interface based on the first input signal. The first elevator control signal is transmitted to the elevator control by the interface in order to initiate the movement of the elevator car to the first defined floor. A camera recording of the interior of the elevator car is received by the interface once the visitor has entered the elevator car. The camera recording is transmitted to the communication device by the interface via the communication network. A second input signal is received by the interface via the communication network, wherein the second input signal is generated in that the host initiates a movement of the elevator car to a second defined floor, on which the visitor would like to exit the elevator car, by means of an input on the communication device. A second elevator control signal is generated by the interface based on the second input signal. The second elevator control signal is transmitted to the elevator control by the interface in order to initiate the movement of the elevator car to the second defined floor.

Another aspect of the technology concerns a system for a building with multiple floors. The system comprises an elevator system with an elevator control, an elevator car and a drive unit, which moves the elevator car between floors of the building upon activation by the elevator control. A camera is arranged in the elevator car in order to produce a camera recording of an interior of the elevator car. The system furthermore comprises an interface that is communicatively linked to the elevator control and the camera, wherein the interface has a processing unit and a transmitting and receiving unit in order to communicate with a communication device of a host and a mobile device of a visitor via a communication network.

During the operation of the system, the processing unit carries out a method, according to which a first input signal is received by the interface, wherein the first input signal indicates that a host initiates a movement of the elevator car to a first defined floor, on which a visitor would like to enter the elevator car, by means of an input on a communication device. A first elevator control signal is generated by the interface based on the first input signal. The first elevator control signal is transmitted to the elevator control by the interface in order to initiate the movement of the elevator car to the first defined floor. A camera recording of the interior of the elevator car is received by the interface once the visitor has entered the elevator car. The camera recording is transmitted to the communication device by the interface via the communication network. A second input signal is received by the interface via the communication network, wherein the second input signal is generated in that the host initiates a movement of the elevator car to a second defined floor, on which the visitor would like to exit the elevator car, by means of an input on the communication device. A second elevator control signal is generated by the interface based on the second input signal. The second elevator control signal is transmitted to the elevator control by the interface in order to initiate the movement of the elevator car to the second defined floor.

The security in a building can be improved in a user-friendly and cost-effective manner with the aid of the technology described herein. The individual sense of security for individual persons in the building, for example a host expecting a visitor, is thereby enhanced. The technology described herein makes this possible, among other things, in that the host gains control over the elevator system in the building to a limited extent for a limited period of time. For example, the host can reserve an elevator (or an elevator car) for the visitor and virtually monitor the visitor on his way to the host. The virtual monitoring is realized, e.g., in that the host can watch a camera recording of the interior of the elevator car from his current location (e.g. office or residence) and only initiate the movement of the elevator to the destination floor when only the visitor is located in the cabin. The host therefore knows who is arriving on the destination floor.

The security and the individual sense of security are also promoted in that an exemplary embodiment of the technology described herein enables the host to control the building entrance. The host can release the building entrance once he was able to confirm the identity of the visitor, e.g. by speaking to the visitor and/or watching a camera recording of the visitor.

During the control of the elevator system, as well as during the control of the building entrance, the host can respectively identify the person entering the elevator car or walking through the building entrance. This makes it possible to detect a potentially unauthorized person who follows the visitor (in a potentially undetected manner). If such a situation is detected by the host, he can notify the security service, keep the building entrance locked and/or prevent or delay the elevator ride of the user (e.g. until this person has once again exited the elevator car) depending on the respective situation.

An advantage of the technology described herein can be seen in that it can be cost-effectively implemented. This particularly applies if the host and the host [sic; visitor] use a smartphone, which they already carry along for other purposes and is equipped with application software provided for this technology. The visitor can use the smartphone, e.g., for contacting the host when he would like to access the building. The host can use the smartphone for confirming the identity of the visitor, for releasing the building entrance, for reserving an elevator for the visitor and for initiating the elevator ride of the visitor to the destination floor.

The interface used in accordance with this technology can be linked to the elevator system in the building flexibly and without excessive effort, e.g. arranged in the elevator shaft or in an engine room. In an exemplary embodiment, the transmitting and receiving unit of the interface is designed for communicating via radio such that the installation effort is reduced.

The interface generally serves for transmitting data, voice (or voice data) and/or image data; it is accordingly designed for at least one of these purposes. The aforementioned transmission may be realized in accordance with one or more technologies, e.g. VoIP (voice over Internet protocol) technology, a mobile radio communication technology (e.g. 4G/LTE (long-term evolution)) or a wire-bound technology (e.g. Ethernet technology).

Flexibility is also achieved with respect to the communication device of the host. In an exemplary embodiment, the communication device of the host is a mobile device (e.g., a smartphone), which communicates with the interface of via a radio link. This eliminates the need for a wired link with the interface. In another exemplary embodiment, the communication device of the host is linked to a building installation, wherein the building installation is connected to the interface.

The technology described herein also allows flexibility with respect to the distribution of the functionalities. For example, the interface may be configured in such a way that a software application is stored therein. Alternatively, the software application or program portions thereof may be made available by an infrastructure for cloud computing. In this case, the interface accesses this infrastructure on demand in order to execute the software application. In an exemplary embodiment, the communication network comprises the infrastructure for cloud computing.

In an exemplary embodiment, a third input signal is received by the interface via the communication network, wherein the third input signal is generated in that the host confirms an identity of the visitor by means of an input on the communication device. A door control signal, which is transmitted to a building control by the interface in order to initiate the release of a building entrance, is generated based on the third input signal. The building security is thereby enhanced because the host can control access to the building.

In an exemplary embodiment, the interface transmits a reply to the communication device via the communication network in order to inform the host that the building entrance has been opened. Information on that a visitor now has access to the building can enhance the sense of security of the host.

In an exemplary embodiment, the camera recording is transmitted to the communication device as long as the user is located in the elevator car. In this way, the movement of the visitor up to the destination floor can be monitored and the host receives continuous information on the location of the visitor.

In an exemplary embodiment, a status signal generated by the elevator control is received by the interface. The status signal indicates that the elevator car has reached the second defined floor (destination floor). The status signal is transmitted to the communication device in order to inform the host that the user has arrived on the destination floor. This information can also enhance the sense of security of the host; in addition, the host can subsequently receive the visitor.

In an exemplary embodiment, the first elevator control signal switches the elevator system from a normal operating mode into a visitor operating mode. In this visitor operating mode, an elevator car is reserved for a ride of the visitor such that the visitor can reach the host with the least delay possible. Once the elevator car has reached the second defined floor, the elevator system is switched back from the visitor operating mode into the normal operating mode. In this way, the elevator system is once again switched back into the normal operating mode as quickly as possible in order to prevent the delay of rides of other persons.

In an exemplary embodiment, a camera recording produced by the communication device of the host is transmitted to a mobile device of the visitor by the interface. The camera recording shows the host. In this way, the visitor can assure himself that the host is actually the person he would like to visit.

The building security and the sense of security of the host can be enhanced in that the host is able to control the elevator door. In an exemplary embodiment, a fourth input signal is received by the interface via the communication network for this purpose, wherein the fourth input signal is generated in that the host initiates opening or closing of an elevator door by means of an input on the communication device. A third elevator control signal is generated by the interface based on the fourth input signal and transmitted to the elevator control, wherein the third elevator control signal causes the elevator door to open or close.

BRIEF DESCRIPTION OF THE DRAWINGS

Different aspects of the enhanced technology are described in greater detail below with reference to exemplary embodiments illustrated in the figures. Identical elements are identified by the same reference symbols in the figures. In these figures.

DETAILED DESCRIPTION OF EMBODIMENTS OF THE INVENTION

Figure 1:
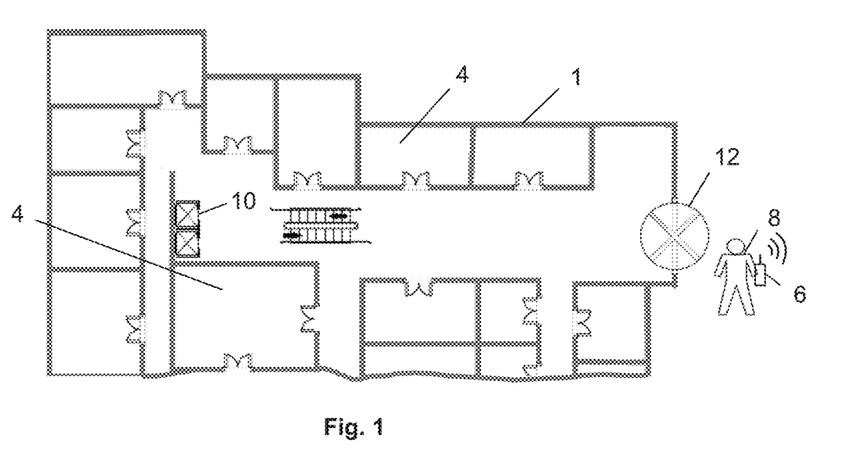
FIG. 1 shows a schematic representation of an exemplary situation on a partially illustrated building floor serviced by an elevator system.
Figure 2:
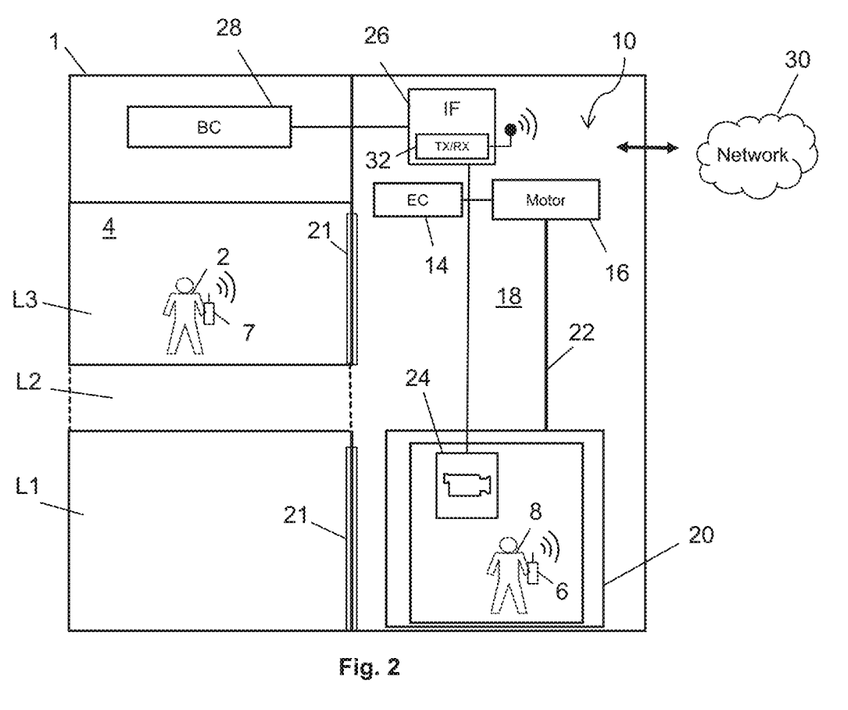
FIG. 2 shows a schematic representation of part of the building in the form of a side view, wherein multiple floors and components of the elevator system are illustrated in this figure.

FIG. 1 shows a schematic representation of an exemplary situation on a partially illustrated floor of a building 1, which can be entered through a building entrance 12 and comprises an elevator system 10 and a plurality of rooms 4. The building entrance 12 may lead, e.g., into a lobby. For example, the rooms 4 may be residences, halls and/or offices or other business premises. In the situation illustrated in FIG. 1, a person 8 is located outside the building 1 in the vicinity of the building entrance 12 and would like to visit a person 2 in the building 1 (FIG. 2). In another situation, the person 8 may be located distant from the building 1 (e.g. in a vehicle or in another building). The person 8 outside the building 1 is referred to as a visitor 8 below regardless of whether the person 8 is located in the vicinity of or distant from the building 1. In this description, the term "building" refers, e.g., to residential buildings, office buildings, sports arenas or shopping centers, but also to ships.

In order to better understand the vertical situation in the building 1, FIG. 2 shows a side view of part of the building 1 illustrated in FIG. 1 with an exemplary embodiment of a building control system, which comprises an elevator system 10. The building 1 has multiple floors L1, L2, L3, on which a plurality of rooms 4 are respectively located. For example, the room 4 may form part of a residence or part of office or business premises of the host 2. In FIG. 2, the person 2 expecting the visitor 8 is located in one of the rooms 4 on the floor L3. The person 2 in the room 4 is referred to as host 2 below. A person skilled in the art understands that the technology described herein is not limited to a host/visitor scenario. The designations "host" and "visitor" are used in order to better distinguish between the persons involved.

The visitor 8 carries along a mobile electronic device. 6 (also referred to as mobile device 6 below) for communication purposes as indicated in the examples according to FIG. 1 and FIG. 2. Such a mobile device 6 is equipped with a camera (particularly a digital camera) and a corresponding application-specific software (app). The camera of the mobile device 6 serves for recording individual images and a video. A camera recording may be produced, for example, in a JPEG format, an MPEG format or similar formats.

The mobile device 6 is a smartphone in the exemplary embodiments described herein. A smartphone is a mobile telephone that essentially provides more extensive computer functionalities and connectivity than a mobile telephone, which merely serves for communicating via voice and/or text. All functions typically can be controlled by means of a touch-sensitive screen. In other exemplary embodiments, the mobile device 6 may also be a tablet PC, a notebook/laptop computer or the like, wherein these devices comprise at least one radio module in addition to a camera.

FIG. 2 furthermore shows that the host 2 has a communication device 7 for communication purposes. This communication device 7 may likewise be a mobile electronic device (smartphone, tablet PC, notebook/laptop computer or the like), which the host 2 can carry along as illustrated in FIG. 2. Alternatively, the communication device 7 may also be arranged at a defined location in the residence or the office or business premises of the host 2. It may be linked, for example, to an internal communication network of the building at this defined location. A person skilled in the art understands that a thusly arranged communication device 7 can—depending on its design—also have functionalities, which correspond to those of a smartphone, a tablet PC and/or a notebook/laptop computer. These functionalities may also comprise the functionality of an intercom system with or without video function.

In the exemplary embodiment illustrated in FIG. 2, the elevator system 10 comprises an elevator control (EC) 14, an elevator car 20, in which a camera 24 is arranged, and a drive unit (motor) 16. A person skilled in the art understands that the elevator system 10 may comprise additional components (e.g. operating terminals on the floors L1, L2, L3), which are not illustrated in the figures in order to provide a better overview. In addition, a person skilled in the art generally is familiar with the components of the elevator system 10 and its mode of operation such that detailed explanations in this respect are only provided as far as they appear necessary for the better understanding of the technology described herein. For example, the elevator control 32 processes a received elevator call and activates the drive unit 34 accordingly in order to move the elevator car 49 in a shaft 18 with the aid of a suspension means 22. In the situation illustrated in FIG. 2, the visitor 8 is already located in the elevator car 20 and can be transported to the desired destination floor, e.g. to the floor L3, on which the host 2 is located. A car door of the elevator car 20 and a floor door are opened upon arrival on the desired floor L3. The car door and the floor door are referred to as elevator door 21 below, wherein two floor doors are illustrated in FIG. 2 and identified by the reference symbol 21. Depending on the design of the building 1, the visitor 8 either may arrive directly in the room 4 of the host 2 or in a hallway or corridor, from which the visitor 8 can reach the room 4 or be picked up. Once the visitor 8 has arrived at the host 2, the communication link can be terminated by one of the two parties.

In the situation illustrated in FIG. 1 and FIG. 2, the technology described herein can be advantageously utilized for meeting security requirements defined for the building 1, namely with the least complexity possible and without restricting the ease of use. According to a brief and exemplary summary, the building control system operates as follows: as soon as the visitor 8 is located at the building 1, the visitor 8 contacts the host 2 in order to gain access to the building 1. In an exemplary embodiment, this contact is established by means of the mobile device 6 carried along by the visitor 8. The mobile device 6 is equipped with an application-specific software (app) that activates the camera of the mobile device 6 and transmits a camera recording of the visitor 8 to the communication device 7 of the host 2. In an exemplary embodiment, the communication device 7 of the host 2 is likewise equipped with such an app. The host 2 can confirm the identity of the visitor 8 based on the received camera recording and grant the visitor 8 access to the building 1. The host 2 can subsequently use the communication device 7 for inputting an elevator call, by means of which the elevator system 10 is switched into a visitor operating mode. Due to this elevator call, an elevator car 20 is reserved for a ride of the visitor 8 and moved, for example, to a lobby of the building 1. Once the visitor 8 has entered the elevator car 20, the communication device 7 of the host 2 receives a camera recording of the interior of the elevator car 20, which is produced by the camera 24. The camera 24 serves for recording individual images or a video depending on its design. A camera recording may be produced, for example, in a JPEG format, an MPEG format or similar formats. Based on this camera recording, the host 2 can assure himself, for example, that only the visitor 8 is located in the elevator car. If this is the case, the host 2 inputs an elevator call such that the elevator car 20 is moved to the desired destination floor. The ride to the desired destination floor takes place without stops in order to ensure that only the visitor 8 is located in the elevator car 20 upon its arrival on the destination floor.

Furthermore, additional components of the building control system in the form of a building control 28 (identified by the reference symbol BC in FIG. 2) and an interface 26 (identified by the reference symbol IF in FIG. 2) are arranged in the part of the building 1 illustrated in FIG. 2. The interface 26 is communicatively linked to the building control 28 and the elevator control 14. In addition, the interface 26 is communicatively linked to the camera 24 in order to receive camera recordings of the elevator car interior. The interface 26 has a transmitting and receiving device unit 32 (identified by the reference symbol TX/RX in FIG. 2). In an exemplary embodiment, the transmitting and receiving unit 32 is designed for transmitting and receiving radio signals in order to communicate wirelessly via a communication network 30 (referred to as network 30 below).

The interface 26 generally serves for transmitting data, voice (or voice data) and/or image data, as well as their storage; it is accordingly designed for at least one of these purposes. In an exemplary embodiment, the interface 26 not only comprises the camera 24, but also a power supply, a central processing unit 31 (identified by the reference symbol CPU in FIG. 4), memory devices (e.g. RAM, flash memory), data connections (e.g. for USB, Ethernet) and a signal processing device, e.g. for encoding and decoding data. The central processing unit is designed and programmed for controlling and monitoring these components (including the transmitting and receiving unit 32), as well as the communication taking place between these components, during the operation of the system. The aforementioned transmission may be realized in accordance with one or more technologies, e.g. VoIP (voice over Internet protocol) technology, a mobile radio communication technology (e.g. 4G/LTE (long-term evolution)) or a wire-bound technology (e.g. Ethernet technology).

In an exemplary embodiment, the building control 28 has, among other things, the function of monitoring access to the building 1. For this purpose, the building control 28 may be equipped with the functionality of an access control system or be connected to a separate access control system. This functionality or access control system respectively monitors the building entrance 12 such that only authorized persons can enter the building 1, e.g. by unlocking an electronic lock in order to release a door, a barrier, a turnstile or another physical barrier.

Figure 3:
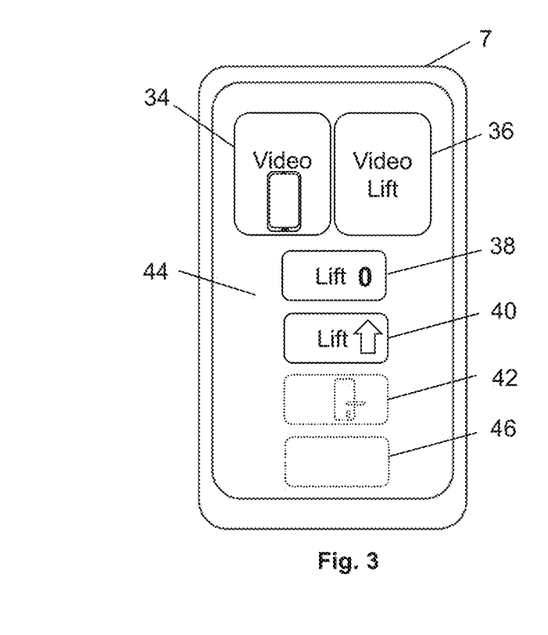
FIG. 3 shows an exemplary user interface on a screen of a communication device of a host.

FIG. 3 shows an exemplary user interface on a screen 44 of the communication device 7 of the host 2. In order to function in accordance with the technology described herein, the communication device 7 is equipped with corresponding hardware, e.g. one or more communication modules for wire-bound and/or wireless communication, and the screen 44, e.g. a touch-sensitive screen (also referred to as touch screen display). The communication device 7 is furthermore equipped with corresponding operating and/or application software (e.g. one or more application programs (apps)). Depending on the respective design of the communication device 7, for example, each communication module and each app can be selectively activated and/or deactivated by means of a graphical user interface (also referred to as GUI). For example, the communication device 7 may be a smartphone, a tablet PC or a notebook/laptop computer as mentioned above.

The communication device 7 is a smartphone in the exemplary embodiment illustrated in FIG. 3. The user interface for the technology described herein is generated by an application-specific software installed on the communication device 7; it represents the graphical user interface that simplifies the operation of the communication device 7 for the technology described herein. The user interface illustrated in FIG. 3 contains two panels 34, 36 for displaying camera recordings; the panel 34 (left) is intended for a camera recording originating from the mobile device 6 of the visitor 8 and the panel 36 (right) is intended for a camera recording originating from the camera 24 in the elevator car 20. It should be noted that the panels 34, 36 may be active simultaneously or at different times. For example, the panels 34, 36 are active at different times if the panel 34 (already) displays a camera recording of the mobile device 6 of the visitor 8 while no camera recording of the elevator car 20 is displayed (yet) in the panel 36. This also applies conversely, i.e. if the camera recording of the elevator car 20 is displayed in the panel 36 while no camera recording is displayed in the panel 34.

An input panel 38 (illustrated in the form of the word "elevator" and the numeral "0") makes it possible to input a call that initiates the movement of the elevator car 20 to a defined floor L1, L2, L3 by means of the drive unit 16. An input panel 40 (illustrated in the form of the word "elevator" and an upwardly directed arrow) makes it possible to input a call that initiates the movement of the elevator car 2 to a defined destination floor. Another input panel 42 (illustrated in the form of a symbol for a door) enables the host 2 to unlock the building door 12 from the room 4; this functionality may be optional in certain exemplary embodiments (which is the reason why the input panel 42 is drawn with dotted lines). A person skilled in the art understands that the user interface illustrated in FIG. 3 merely is an example and that, e.g., the arrangement of the panels 34, 36, 38, 40, 42 and/or their designations/labels and symbols may be realized differently in other exemplary embodiments of the user interface. A person skilled in the art also understands that other or additional panels can be displayed, for example, in order to open and/or close elevator doors or to trigger an alarm. In FIG. 3, this is symbolically illustrated in the form of an empty panel 46 drawn with dotted lines.

The user interface of the exemplary embodiment illustrated in FIG. 3 is based on the assumption that the host 2 is located on an upper floor of the building 1 referred to the lobby. An elevator call generated by pressing/touching the input panel 38 initiates the movement of the elevator car 20 to the floor, on which the lobby is located (lobby floor), by means of the drive unit 16 if the elevator car is located on a different floor and as soon as it is available and able to respond to a call. The elevator control 14 ignores the generated elevator call if the elevator car 20 is already located on the lobby floor. An elevator call generated by pressing/touching the input panel 40 initiates the upward movement of the elevator car 20 to a defined destination floor, e.g. to the floor, on which the host 2 is located, or to another floor; in an office building, for example, this may be a floor, on which conference rooms or the like are located.

Figure 4:
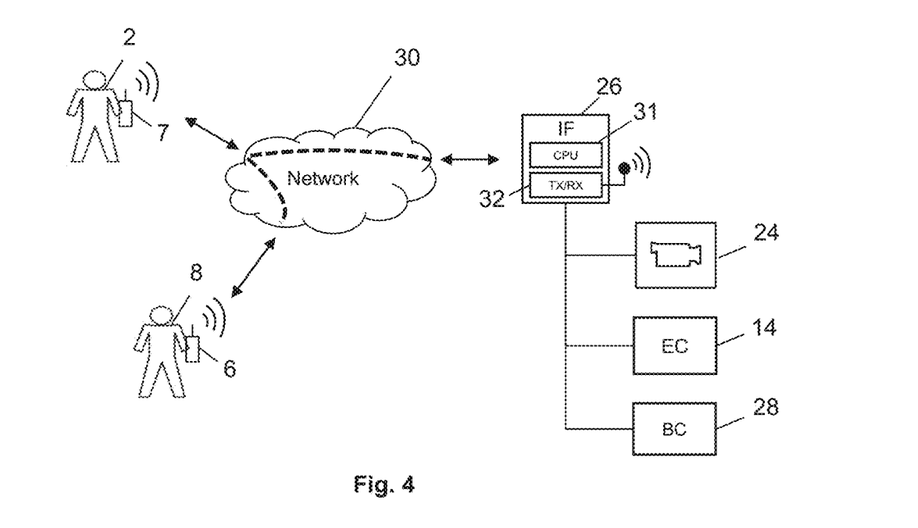
FIG. 4 shows a schematic representation of interactions between an interface, the communication device of the host and a mobile device of the visitor via a network.

FIG. 4 shows a schematic representation of interactions between the interface 26, the communication device 7 and the mobile device 6 via a network 30 according to an exemplary embodiment. The network 30 comprises a mobile communication network that allows communications in accordance with one of the known mobile radio communication standards; it may be realized, for example, in the form of a GSM, UMTS or LTE mobile communication network. Accordingly, the communication device, 7, the mobile device 6 and the transmitting and receiving unit 32 are respectively equipped with radio modules that operate in accordance with the chosen mobile radio communication standard. For example, the mobile device 6 of the visitor 8 can thereby communicate with the communication device 7 of the host 2, e.g. for voice and/or data communication (including the transmission of image data).

The network 30 furthermore comprises a data network, which may be part of an IT infrastructure for so-called cloud computing (commonly also referred to as "cloud"). This refers, for example, to the storage of data in a remote computer center, but also to the execution of programs that are not installed locally, but rather remotely. Depending on the respective design, a certain functionality may be made available, for example, in the interface 26 or via the "cloud." For example, a software application or program portions thereof may for this purpose be executed in the "cloud." In this case, the interface 26 accesses this infrastructure on demand in order to execute the software application.

This IT infrastructure can be accessed, for example, via the mobile communication network. The communication device, 7, the mobile device 6 and the transmitting and receiving unit 32 have Internet capability and can respectively access the Internet or its functionalities and computer devices by means of mobile radio communication. The communication may take place in accordance with a known transmission protocol, e.g. TCP (Transmission Control Protocol), IP (Internet Protocol) and UDP (User Data Protocol).

FIG. 4 shows that the interface 26 or its transmitting and receiving unit 32 respectively communicates with the network 30. In the example shown, the communication device 7 of the host 2 communicates with the mobile device 6 of the visitor 8 and with the interface 36; however, the mobile device 6 of the visitor 8 does not communicate with the interface 26 in the exemplary embodiment shown. The camera 24, the elevator control 14 and the building control 28 are linked to the interface 26. This link may be realized in the form of an internal data network of the building, which is connected to one or more of the aforementioned data connections (USB, Ethernet). The data network may comprise a wire-bound bus system (e.g. an Ethernet bus) and/or a radio system (e.g. a WLAN/WiFi system).

In FIG. 2, the network 30 is schematically illustrated outside the building 1. A person skilled in the art understands that the network 30 may comprise an internal communication network of the building. The internal communication network of the building may serve, for example, for communication purposes of the building control 28 and the elevator system 10 including the communication between the elevator system 10, the building control 28 and the interface 26.

With the understanding of the above-described system components and their functionalities, an exemplary method for operating the system comprising the elevator system 10 is described below with reference to FIG. 5; the elevator system 10 is operated in a visitor operating mode in this case. The description is based on the interface 26 and refers to a (single) visitor 8, who would like to enter the building at the building entrance 12 in order to reach the host 2. A person skilled in the art understands that the visitor 8 may also arrive in the company of one or more persons. The visitor 8 carries along the mobile device 6 and has activated its radio module and a software application in accordance with the technology described herein. The method begins in step S1 and ends in step S7.

Once the visitor 8 is located at the building entrance 12, the visitor 8 contacts the host 2 in order to announce his arrival. In an exemplary embodiment, the visitor 8 contacts the host 2 by using the application software installed on the mobile device 6, e.g. via the network 30 and similar to the function of the chat service "FaceTime" by Apple Inc., which is based on Internet protocol/IP telephony. This application software attempts to establish a communication link with the communication device 7 of the host 2. If the host 2 responds to the contact attempt, a voice and data link is established between the communication device 7 and mobile device 6. In this case, the communication device 7 and the mobile device 6 exchange data, e.g. a code that is only valid for this communication link. Among other things, this ensures that the communication only takes place between the visitor 8 and the host 2 or between their devices, respectively.

Once this link has been established, the camera of the mobile device 6 of the visitor 8 is activated in order to transmit a camera recording of the visitor 8 to the communication device 7 of the host 2. The visitor 8 may be notified of the camera activation, e.g. by displaying a text message or a symbol and/or by generating an audible signal (sound, sound sequence). The received camera recording is displayed on the communication device 7 of the host 2 in the panel 34 (FIG. 3). The host 2 can thereby confirm the identity of the visitor 8. Depending on the respective design, a camera recording showing the host 2 may likewise be displayed on a screen of the mobile device 6. In this way, the visitor 8 can also assure himself that the host is actually the person he would like to visit.

Once the identity of the visitor 8 has been confirmed, the visitor 8 can be granted access to the building 1 by the host 2. In an exemplary embodiment, the host 2 presses (or touches) the input panel 42 on the user interface of his communication device 7 for this purpose. The application software communicates this input to the interface 26 via the network 30. The interface 26 subsequently receives a confirmation signal (ID signal) indicating the confirmed identity in step S2. In step S3, the interface 26 generates a control signal and in an exemplary embodiment transmits this control signal to the building control 28. In FIG. 5, the control signal is referred to as door control signal for the better understanding of the flow chart; however, a person skilled in the art understands that no restriction to a door is intended with this reference. The building control 28 subsequently initiates the release of the building entrance 12 and the visitor 8 can enter the building 1. For example, the door control signal may unlock an electronic lock of a building door in that it activates an electric relay of the electronic lock via the internal communication network of the building such that a bolt or a latch is released.

In an exemplary embodiment, the host 2 may receive a reply indicating that the building entrance 12 has been released and the building door has been opened, wherein this typically means that the visitor 8 has actually entered the building 1. Depending on the respective design of the system, the host 2 can follow the entry of the visitor 8 by means of the camera recording displayed in the panel 34 and talk to the visitor 8, e.g. in order to direct the visitor to the elevator system 10. Depending on the respective design, the transmission of the camera recording may take place, for example, until the visitor 8 has arrived at the host 2. As mentioned above, the visitor 8 may likewise receive a camera recording of the host 2 in an exemplary embodiment.

After the visitor 8 has entered the building 1, the host 2 can respectively press or touch the input panel 38 in order to reserve an elevator for the ride of the visitor 8. For example, a movement of the elevator car 20 to the lobby may thereby be initiated. The application software of the communication device 7 communicates this input to the interface 26 in the form of a first input signal via the network 30. The interface 26 generates a first elevator control signal after the reception of the first input signal and transmits this first elevator control signal to the elevator control 14 via the internal communication network of the building in step S4. The first elevator control signal can be interpreted in the form of a floor call, by means of which an elevator passenger merely inputs the desired moving direction (up/down) on a floor L1, L2, L3. The passenger calls an elevator car to the floor L1, L2, L3, on which the passenger is located, by means of such a floor call. The floor call reserves the elevator car 20 for the ride of the visitor 8 and switches the elevator system 10 into the visitor operating mode.

Depending on the status of the elevator system 10, the elevator car 20 either is directly moved to the lobby floor or reserved for a ride to the lobby floor if the elevator car 20 is currently responding to another call such that the elevator car 20 can be entered as promptly as possible. In an exemplary embodiment, the first elevator control signal reserves the elevator system 10 for a ride of the visitor 8 in both instances. If the elevator system 10 comprises multiple elevator cars, one of these elevator cars is reserved. For example, this prevents the elevator system 10 from responding to another call while the visitor 8 is on his way from the building entrance 12 to the elevator system 10. Corresponding information may be displayed on a floor terminal in order to inform other users that the elevator system 10 or an elevator car is reserved for a short period of time.

Depending on the respective design of the system, the host 2 can control the operation of the (reserved) elevator car 20 when it is located on the lobby floor. In an exemplary embodiment, the host 2 can control the elevator door 21, e.g. open and close the elevator door 21. For this purpose, the communication device 7 of the host 2 may display additional panels on the user interface, e.g. for the functions "open door" and "close door." For example, the system may be realized in such a way that the elevator car 20 waits for the visitor 8 on the lobby floor while the elevator door 21 is closed in the visitor operating mode. Once the visitor 8 is located at or in the vicinity of the elevator car 20, the host 2 can initiate opening of the elevator door 21 by means of an input (e.g. "open door") on the communication device 7. In another exemplary embodiment, the elevator car 20 may wait for the visitor 8 on the lobby floor while the elevator door 21 is open. Regardless of whether the elevator car 20 waits for the visitor while the elevator door 21 is closed or open, the host can in an exemplary embodiment only initiate closing of the elevator door 21 by means of an input (e.g. "close door") on the communication device 7 if the visitor 8 is alone in the elevator car 20.

Once the visitor 8 has entered the elevator car 20, the camera 24 produces a camera recording of the visitor 8, which is transmitted to the interface 26, e.g. via the internal communication network of the building. The camera 24 may be operated in different ways; for example, it may be activated constantly regardless of whether the elevator car 20 is moving or not and regardless of whether the elevator car is empty or occupied by at least one passenger. In this case, the entry of the visitor 8 into the elevator car 20 is visible in the camera recording (and can be followed by the host 2) as soon as the visitor 8 reaches a coverage area of the camera 24. Alternatively, the camera 24 may be activated when the visitor 8 enters the elevator car 20; this can be detected, for example, by means of a load sensor or another sensor (e.g. a motion sensor). The consent of the visitor 8 for the camera recording may be desirable for reasons of data protection. This consent may be implicitly given by the use of the app installed on the mobile device 6 of the visitor 8. However, the host 2 and/or the app may also explicitly request the consent of the visitor 8, e.g. in the form of a spoken consent or in the form of a corresponding input (e.g. keystroke) on the mobile device 6 or a terminal in the elevator car 20.

In step S5, the interface 26 receives the camera recording of the elevator car 20 and in an exemplary embodiment transmits this camera recording to the communication device 7 of the host 2 via the network 30. A person skilled in the art understands that the transmission of the camera recording may take place entirely or partially via the internal communication network of the building, which in an exemplary embodiment forms part of the network 30, e.g. if the communication device 7 is arranged at a fixed location in the residence or the office or business premises of the host 2 as described above. In an exemplary embodiment, the communication device 7 displays the camera recording in the panel 36.

The host 2 can assess if the visitor 8 is alone in the elevator car 20 based on the camera recording displayed in the panel 36. If the visitor 8 arrives with company, the host 2 can assess the authorization of the company analogous to the assessment of the visitor 8. If the visitor 8 is alone or with authorized company in the elevator car 20, the host 2 can respectively press or touch the input panel 40 in order to initiate the movement of the elevator car 20 to the defined destination floor. The application software communicates this input to the interface 26 via the network 30. The interface 26 subsequently generates a second elevator control signal and transmits this second elevator control signal to the elevator control 14 via the internal data network of the building in step S6. The second elevator control signal can be interpreted in the form of an elevator car call analogous to an elevator system, in which the passenger inputs the moving direction on the floor L1, L2, L3. In this case, the passenger is located in the elevator car 20 and inputs the desired destination floor on an elevator car terminal.

Figure 5:
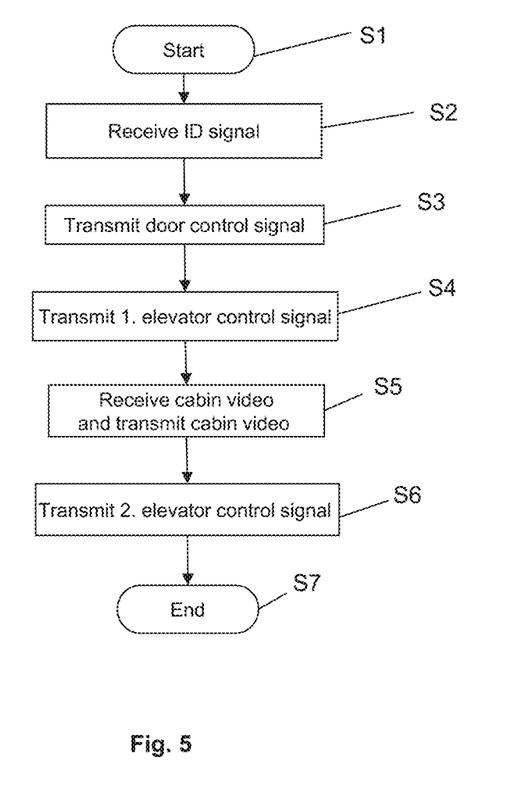
FIG. 5 shows a flow chart of an exemplary embodiment of a method for operating the elevator system in a visitor operating mode.

The exemplary method illustrated in FIG. 5 ends in step S7.

The host 2 may likewise be notified of the arrival of the visitor 8 on the destination floor on the user interface of the communication device 7. For this purpose, the elevator control 14 generates a status signal (which is derived, for example, from a signal indicating the door status (e.g. door open)) upon the arrival on the destination floor and transmits this status signal to the interface 26. The interface 26 forwards this status signal to the communication device 7 of the host 2 via the network 30. The application software of the communication device 7 generates a message on the user interface of the mobile device 6 based on this status signal.

The aforementioned reservation is canceled after the visitor 8 has exited the elevator car 20. The elevator system 10 can then respond to newly received calls in the normal mode (normal operating mode). The elevator system 10 or the elevator car 20 is only reserved for a relatively short time; the reservation is defined by the time required by the visitor 8 for moving from the building entrance 12 to the destination floor. This minimizes a potential impairment of other persons using the elevator system 10, e.g. prolonged waiting periods because no elevator cars or only a few elevator cars are currently available.

A person skilled in the art understands that the method illustrated in FIG. 5 can be modified for different applications. For example, the visitor 8 may already be located in the building 1 such that the building door 12 does not have to be opened. In this case, the generation of the control signal for opening the door in step S3 can be eliminated. For example, the visitor 8 may have been admitted into the building 1 previously, namely either by the host 2 or another (authorized) person in the building 1, without intending to directly visit the host 2. For example, a sales representative may want to visit multiple customers in the building 1 at different times. When the visitor 8, who is already located in the building 1, ultimately would like to visit the host 2, the visitor can contact the host 2 as described above in connection with step S2 such that the host 2 reserves an elevator car 20 for the ride of the visitor 8.

The security requirements for the building 1 may stipulate that a visitor 8 is also monitored on his way out of the building 1, e.g. in order to ensure that the visitor 8 actually exits the building 1. The technology described herein can also be adapted to such security requirements. For example, the host 2 can switch the communication device 7 from the above-described reception mode into a departure mode toward the end of the visit, namely either automatically or by means of a manual input by the host 2. The elevator car 20 can be reserved, for example, for a ride to the lobby by touching the panel 40 in the departure mode. Once the visitor 8 has entered the elevator car 20, the host 2 can touch the panel 38 in order to initiate the ride to the lobby. In an exemplary embodiment, no camera recording of the interior of the elevator car 20 is transmitted to the communication device 7; however, such a transmission may take place if so desired, e.g. by the host 2. After the visitor 8 exits the elevator car 20 into the lobby, the host 2 can follow the movement of the visitor 8 out of the building by means of the camera recording. The communication link can be terminated by one of the two parties once the visitor 8 has exited the building 1.

In addition, either the host 2 or the visitor 8 can attempt to establish a communication link between the communication device 7 and the mobile device 6 of the visitor 8 as described in another text portion of this description. In this exemplary embodiment, the host 2 and the visitor 8 therefore can see one another by means of their respective devices (6, 7).

The technology described herein also contributes to meeting the security requirements if the visitor 8 does not carry along a mobile device 6. In such instances, the visitor 8 can use a doorbell or intercom system provided at the building entrance 12 in order to contact the host 2. The host 2 can subsequently open the building door in order to admit the visitor 8 into the building 1. The host 2 can then reserve the elevator car 20 and initiate the ride to the destination floor in the above-described manner.

The invention claimed is:

1. A method for operating a system with an elevator system and an interface for communication via a communication network, wherein the elevator system comprises an elevator control, an elevator car and a drive unit, which moves the elevator car between floors of a building upon activation by the elevator control, wherein a camera is arranged in the elevator car in order to produce a camera recording of an interior of the elevator car, comprising:
   receiving a first input signal via the interface, wherein the first input signal indicates that a host initiates a movement of the elevator car to a first defined floor, on which a visitor would like to enter the elevator car, the first input signal being provided via an input on a communication device;
   generating a first elevator control signal via the interface based on the first input signal;
   transmitting the first elevator control signal to the elevator control via the interface in order to initiate movement of the elevator car to the first defined floor;
   receiving a camera recording of the interior of the elevator car via the interface once the visitor has entered the elevator car;
   transmitting the camera recording to the communication device by means of the interface and the communication network;
   receiving a second input signal via the interface and the communication network, wherein the second input signal is generated in response to the host initiating a movement of the elevator car to a second defined floor, on which the visitor would like to exit the elevator car, the second input signal being provided via an input on the communication device;
   generating a second elevator control signal via the interface based on the second input signal;
   transmitting the second elevator control signal to the elevator control via the interface in order to initiate movement of the elevator car to the second defined floor;

receiving a further input signal via the interface and the communication network, wherein the further input signal is generated in response to the host initiating opening or closing of an elevator door via an input on the communication device;
generating a third elevator control signal via the interface based on the further input signal; and
transmitting the third elevator control signal to the elevator control, wherein the third elevator control signal causes the elevator door to open or close.

2. The method according to claim 1, further comprising:
receiving a third input signal via the interface and the communication network, wherein the third input signal is generated in response to the host confirming an identity of the visitor via an input on the communication device;
generating a door control signal based on the third input signal; and
transmitting the door control signal to a building control via the interface in order to initiate a release of a building entrance.

3. The method according to claim 2, further comprising:
transmitting a reply to the communication device via the interface and the communication network in order to inform the host that the building entrance has been opened.

4. The method according to claim 1, in which the camera recording is transmitted to the communication device as long as the visitor is located in the elevator car.

5. The method according to claim 1, further comprising:
receiving a status signal generated by the elevator control via the interface, wherein the status signal indicates that the elevator car has reached the second defined floor, and
transmitting the status signal to the communication device in order to inform the host that the visitor has arrived on the second defined floor.

6. The method according to claim 1, in which the first elevator control signal switches the elevator system from a normal operating mode to a visitor operating mode.

7. The method according to claim 6, in which the elevator system is switched from the visitor operating mode to the normal operating mode once the elevator car has reached the second defined floor.

8. The method according to claim 1, further comprising:
transmitting a camera recording produced by the communication device to a mobile device of the visitor via the interface, wherein the camera recording shows the host.

9. A system for a building with multiple floors, the system comprising:
an elevator system with an elevator control, an elevator car and a drive unit, which moves the elevator car between the floors of the building upon activation by the elevator control, wherein a camera is arranged in the elevator car in order to produce a camera recording of an interior of the elevator car; and
an interface that is communicatively linked to the elevator control and the camera, wherein the interface has a processing unit and a transmitting and receiving unit in order to communicate with a communication device of a host and a mobile device of a visitor via a communication network, and wherein the processing unit causes the system to:
receive a first input signal via the interface, wherein the first input signal indicates that the host initiates a movement of the elevator car to a first defined floor, on which a visitor would like to enter the elevator car, the first input signal being provided via an input on a communication device;
generate a first elevator control signal via the interface based on the first input signal;
transmit the first elevator control signal to the elevator control by means of the interface in order to initiate movement of the elevator car to the first defined floor;
receive a camera recording of the interior of the elevator car via the interface once the visitor has entered the elevator car;
transmit the camera recording to the communication device via the interface via the communication network;
receive a second input signal via the interface and the communication network, wherein the second input signal is generated in response to the host initiating a movement of the elevator car to a second defined floor, on which the visitor would like to exit the elevator car, the second signal being provided via an input on the communication device;
generate a second elevator control signal via the interface based on the second input signal;
transmit the second elevator control signal to the elevator control via the interface in order to initiate movement of the elevator car to the second defined floor;
receive a further input signal via the interface and the communication network, wherein the further input signal is generated in response to the host initiating opening or closing of an elevator door via an input on the communication device;
generate a third elevator control signal via the interface based on the further input signal; and
transmit the third elevator control signal to the elevator control, wherein the third elevator control signal causes the elevator door to open or close.

10. The system according to claim 9, in which the communication network comprises an infrastructure for cloud computing.

11. The system according to claim 9, in which the transmitting and receiving unit is equipped for communicating via radio.

12. The system according to claim 9, in which the communication device is linked to a building installation, wherein the building installation is connected to the interface.

13. The system according to claim 9, in which the communication device includes a mobile device that communicates with the interface via a radio link.

* * * * *